United States Patent
Nishikiori et al.

[11] Patent Number: 6,042,628
[45] Date of Patent: *Mar. 28, 2000

[54] CYCLONE TYPE DUST COLLECTOR

[75] Inventors: Shigeru Nishikiori; Hajime Mukai; Syuoiji Moriyama; Hiroshi Awata, all of Tokyo, Japan

[73] Assignee: Toyo Gijutsu Kogyo Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,704

[22] Filed: Nov. 12, 1996

[51] Int. Cl.[7] .......................... B01D 50/00; B01D 45/12; B01D 39/02; B04C 5/04
[52] U.S. Cl. .......................... 55/337; 55/418; 55/459.1; 55/479; 55/518; 55/419
[58] Field of Search .................... 55/459.1, 474, 55/337, 418, 320, 459.2, 459.3, 459.4, 459.5, 447, 479, 518, 419

[56] References Cited

U.S. PATENT DOCUMENTS

| | | |
|---|---|---|
| 3,353,340 | 11/1967 | Carsey . |
| 4,229,194 | 10/1980 | Baille . |
| 4,406,672 | 9/1983 | Berz .......................................... 55/474 |
| 4,600,413 | 7/1986 | Sugden .................................. 55/459.1 |
| 4,670,410 | 6/1987 | Baillie .................................... 55/459.1 |
| 4,750,923 | 6/1988 | Haruta et al. .......................... 55/337 |
| 5,397,546 | 3/1995 | West et al. .............................. 55/228 |

FOREIGN PATENT DOCUMENTS

| | | |
|---|---|---|
| 0 681 871 | 11/1994 | European Pat. Off. . |
| 2621257 | 4/1989 | France . |
| 33 04 344 | 8/1984 | Germany . |
| 55-97234 | 7/1980 | Japan . |
| 62-19268 | 1/1987 | Japan . |
| 5-38483 | 2/1993 | Japan . |
| 5-161861 | 6/1993 | Japan . |
| 691974 | 11/1994 | Japan . |
| 639580 | 12/1978 | U.S.S.R. .................................. 55/337 |

Primary Examiner—David A. Simmons
Assistant Examiner—Robert A. Hopkins
Attorney, Agent, or Firm—Liniak, Berenato, Longacre & White, LLC

[57] ABSTRACT

A cyclone type dust collector having a raw air intake aperture, an air separating chamber including a cylinder of upper part and a reversed circular cone of lower part, inner and outer clean air exhaust ducts, the bottom of the air exhaust ducts being closed, the bottom of the reversed circular cone being opened, the exhaust ducts coaxially disposed passing through the air separating chamber, and the surface of the exhaust ducts being provided with many small holes or mesh, small balls or the like being filled between the outer and inner clean air exhaust ducts. A cylindrical air dividing chamber is connected to the upper wall of the aperture of the air separating chamber coaxially disposed with the air separating chamber, a plate is located surrounding the air exhaust duct and underneath an upper wall of the air separating chamber with a predetermined distance, and a spiral air adjustment and acceleration mechanism is provided to adjust and accelerate the airflow coming through the aperture, the clean air exhaust ducts and spiral airflow adjustment and acceleration mechanism being combined to improve efficiency of dust collecting function is offered.

6 Claims, 12 Drawing Sheets

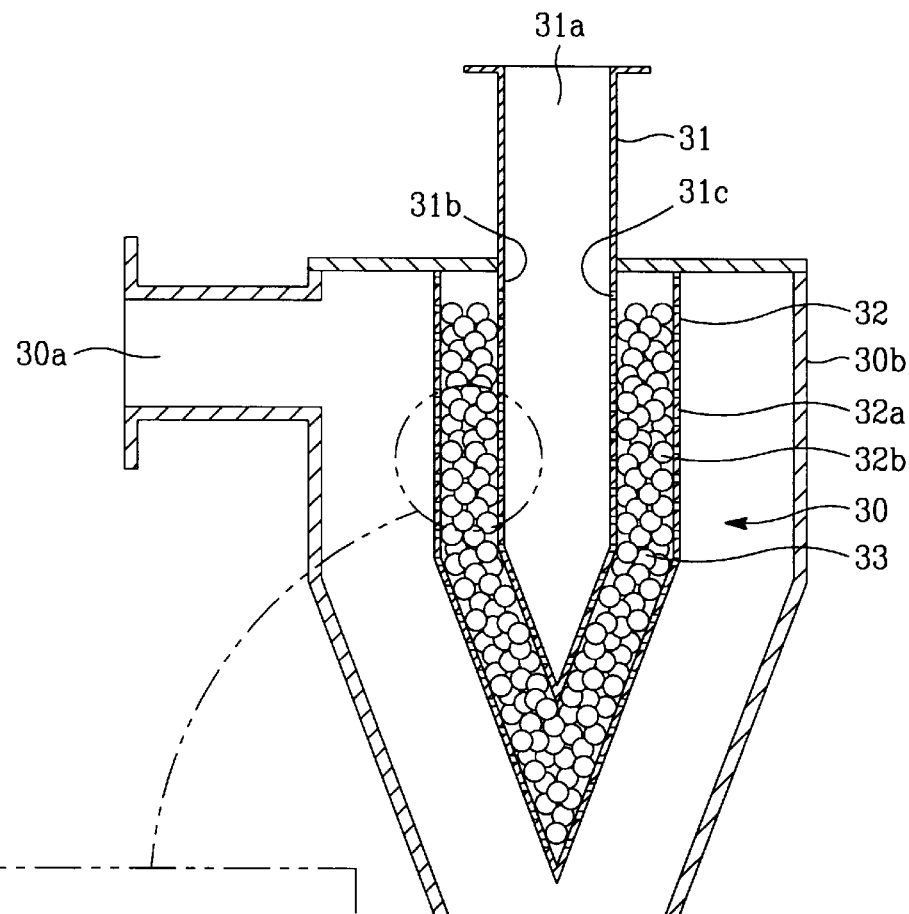
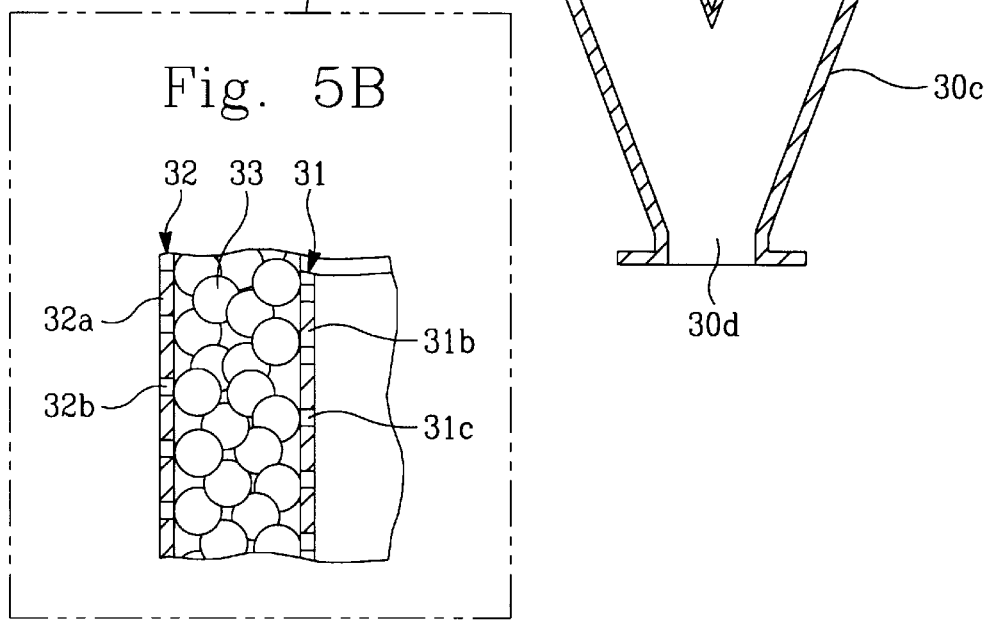
Fig. 5A
Fig. 5B

CYCLONE TYPE DUST COLLECTOR

BACKGROUND OF THE INVENTION

1. Field of the Invention

The present invention relates to an improved cyclone type dust collector without providing any rotation mechanism. The dust collector splashes dust existing in introduced raw air to an inner surface of a cylindrical air separating chamber by means of a centrifugal force generated by spiral airflow. Air remaining in the center of the air separating chamber is exhausted through a clean air exhaust duct.

2. Prior Art

FIG. 1 indicates a conventional cyclone type dust collector disclosed in the Japanese laid-open patent publication of 62-19269. Reference numeral 1 indicates a cyclone type dust collector. The dust collector comprises a cylinder 2a of a upper part and a reversed circular cone 2b of a lower part. Reference numeral 2 indicates an air separating chamber. A dust exhaust aperture 2c is disposed at lowest end of the reversed circular cone 2b. A clean air exhaust duct 3 whose lowest end is closed is provided coaxially passing through the air separating chamber 2 from the upper end of said air separating chamber 2. A notch of louver 3a is provided at a lower part of the clean air exhaust duct 3.

FIG. 2 indicates other conventional cyclone type dust collector disclosed in the Japanese laid-open patent publication of 62-19268. Reference numeral 4 indicates a cyclone type dust collector. The dust collector comprises a cylinder 5a of an upper part and a reversed circular cone 5b of a lower part. Reference numeral 5 indicates an air separating chamber. A dust exhaust aperture 5c is disposed at lowest end of the reversed circular cone 5b. A clean air exhaust duct 6 whose lowest end closed is provided coaxially passing through the air separating chamber 5 from the upper end of said air separating chamber 5. A net like filter 7 is provided at the lower part of said clean air exhaust duct 6.

Reference numeral 8 indicates an air intake duct provided in tangential direction at the cylinder 2a of the air separating chamber 2 in FIG. 1 or the cylinder 5a of the air separating chamber 5 in FIG. 2, respectively.

FIG. 3 and FIG. 4 indicate another conventional cyclone type dust collector disclosed in the Japanese patent publication of 6-91974. FIG. 3 shows a vertical cross section of the cyclone type dust collector. FIG. 4 indicates a horizontal cross section taken along the A—A line of FIG. 3.

In FIG. 3, reference numeral 11 indicates a cylindrical part connecting to an upper end of a reversed circular cone 12. A coarse particles expelling aperture 13 is disposed at lowest end of the reversed circular cone 12. A circular truncated cone 15 having a disc face 16 is disposed at lower axial center CL of the cylindrical part 11 in an air classifying chamber 14.

A divided airflow exhaust structure 18 and a spiral airflow intake structure 19 are disposed coaxially at an upper part 17 of the cylindrical part 11. The divided airflow exhaust structure 18 comprises an outer cylinder 20 of diameter d and an inner cylinder 21 of diameter 0.7 d, the latter is inserted into the former concentrically. Distance between the lowest end of the outer cylinder 20 and the disc face 16 of the circular truncated cone 15 is expressed with reference letter L. The distance between the lowest end of the inner cylinder 21 and the disc face of the circular truncated cone 15 is expressed with reference letter ½ L. The outer cylinder 20 and the inner cylinder 21 are connected to a suction apparatus (not shown in the figure) through an exhaust aperture 22.

Further in FIG. 4, the spiral airflow intake structure 19 is formed such that a dust laden raw air intake duct 25 is protruded in tangential direction from one side of a cylindrical air dividing chamber 24 formed outwardly and concentrically to an air dividing cylinder 23. The cylindrical air dividing chamber 24 is provided with a plural number of air dividing blades 26, 26 . . . protruded spirally and slantingly in inside diameter direction from an air dividing cylinder 23. A dust laden raw air intake duct is connected to said air dividing chamber 24. Raw air is supplied in a predetermined velocity of 12–20 m/s.

The above mentioned cyclone type dust collector intakes dust included raw air from the raw air intake duct 25. Coarse dust particles are expelled from a coarse particles expelling aperture 13 and fine dust particles are exhausted from a fine particles exhausting aperture 22.

According to the aforementioned cyclone type dust collector, the raw air introduced to the cylindrical air dividing chamber 24 through the intake duct 25 forms a spiral airflow as indicated by arrow a and are ejected to the air classifying chamber 14 by means of the air dividing blades 26, 26 . . . of the spiral airflow intake structure 19. The airflow gradually drops (toward dropping direction F1). While, as passages of exhaust air comprise the inner cylinder 21 and outer cylinder 22 and therefore air exhaust aperture is divided to two compartments, a centripetal force is generated toward center CL due to an even parallel airflows from the inner cylinder 21 and the outer cylinder 22 toward center CL. Due to the combination of the centrifugal force and the centripetal force the dust particles included in raw air drop toward composite direction expressed with reference letter F in FIG. 3.

The cyclone type dust collector shown in FIG. 1 is provided with notch of louver 3a. The particles larger than the notch of louver 3a is prevented from passing through said notch of louver. While, fine particles pass through said notch of louver are exhausted through the air exhaust duct 3.

The cyclone type dust collector shown in FIG. 2 has a defect that the filter is clogged and it must be replaced often with new one.

The cyclone type dust collector as shown in FIG. 3 and FIG. 4 has a plural number of air dividing blades 26, 26 . . . protruded under said cylindrical air dividing chamber 24 spirally and slantingly toward inside diameter direction from the inner surface of the air dividing cylinder 23. The air dividing blades 26, 26 . . . have a function to generate spiral airflow but they have no function to accelerate the spiral airflow.

The present invention has been made with the foregoing background in mind and its object resides in providing a dust collector which can eliminate fine dust. The dust collector has no net like filter. The dust collector has a function to accelerate the raw air coming into air separating chamber through cylindrical air dividing chamber. The accelerated air generates centrifugal force, thus dust laden raw air is gathered to the inner surface of the air dividing chamber and clean air remained in the center of the air dividing chamber is exhausted through the clean air exhaust duct.

SUMMARY OF THE INVENTION

It is an object of the present invention as shown in FIG. 5 to offer a cyclone type dust collector comprising a dust laden raw air intake duct 30a disposed in tangential direction to cylinder 30b. The dust collector comprises a cylinder 30b of an upper part and a reversed circular cone 30c of a lower part. A dust exhaust aperture 30d is provided at lowest end of the reversed circular cone 30c. The cylinder 30b and the reversed circular cone 30c forms an air separating chamber 30. An inner clean air exhaust duct 31 is provided with small holes or mesh 31c on the whole surface 31b. The inner clean air exhaust duct 31 is located coaxially with the air separating chamber 30 and an upper clean air exhaust aperture 31a is disposed at the top of said exhaust duct 31. The lowest end of the same is closed. The inner clean air exhaust duct 31 is inserted into an outer clean air exhaust duct 32 with a predetermined distance. The outer clean air exhaust duct 32 is provided with small holes or mesh 32b on the whole surface 32b. The lowest end of the outer clean air exhaust duct is closed. A number of small balls or the like 33 are filled between the inner clean air exhaust duct 31 and the outer clean air exhaust duct 32.

It is of course possible to vibrate said outer clean air exhaust duct 32 or said inner clean air exhaust duct 31, respectively. It is of course possible to vibrate both outer and inner clean air exhaust ducts 32, 31 together or the whole apparatus including all the aforementioned ducts.

Next, in order to achieve the aforementioned object, as shown in FIG. 6 and FIG. 7, the dust collector comprises an upper cylinder 40a and a lower reversed circular cone 40b. The upper cylinder 40a and the reversed circular cone 40b forms an air separating chamber 40. Further, the dust collector comprises the air separating chamber 40, a clean air exhaust duct 41 located concentrically with the air separating chamber 40, a cylindrical air dividing chamber 42 having an upper part 42a connecting to an aperture 40e located on an upper part 40d concentrically with the air dividing chamber 40, raw air intake duct 43 connecting to the cylindrical air dividing chamber 42 in tangential direction, a plate 44a disposed around said clean air exhaust duct 41 and separated from the upper part 40d with a predetermined distance and a spiral airflow adjustment and acceleration mechanism 44 having a plural number of spiral airflow adjustment and acceleration grooves 44b on the plate 44a.

It goes without saying that dust included raw air intake duct 43 disposed at said cylindrical air dividing chamber 42 to intake the air in tangential direction can be disposed with a plural number of said air intake ducts 43.

In the present invention, due to being provided with the spiral airflow adjustment and acceleration mechanism 44, raw air introduced from the air intake duct 43 to the cylindrical air dividing chamber 42 and further to the air separating chamber 40 is splashed to the inner surface of said air separating chamber 40 by means of the spiral airflow adjustment and acceleration mechanism 44 located on the aforementioned plate 44a. The air remaining around the center of the air separating chamber 40 is exhausted through the clean air exhaust duct 41.

As shown in FIG. 8 and FIG. 9, the dust collector of the present invention comprises a cylinder of upper part 40a and a reversed circular cone 40b of lower part. The dust collector further includes a dust exhaust aperture 40c disposed at the lowest end of the reversed circular cone 40b of the air separating chamber 40, a clean air exhaust duct 41 disposed concentrically with the upper part of the air separating chamber 40, a cylindrical air dividing chamber 42 having an upper wall 42a connecting to an aperture 40e disposed concentrically with the upper part 40a of the air separating chamber 40, a dust included raw air intake duct 43 connected to the cylindrical air dividing chamber 42, and a spiral airflow adjustment and acceleration mechanism 44 having spiral airflow adjustment and acceleration grooves 44b disposed on a plate 44a which surrounds the clean air exhaust duct 41.

It goes without saying that a plural number of dust included raw air intake ducts 43 to intake the raw air to the cylindrical air dividing chamber 42 in tangential direction are applied.

Further, as shown in FIG. 10, a modified cyclone type dust collector combining the dust collector as shown in FIG. 5 and the dust collector shown in FIGS. 6–9 was invented. Such dust collector is explained in the following preferred embodiments. The summary is as follows.

In FIG. 10, this dust collector comprises a clean air exhaust duct 51 disposed concentrically with an air separating chamber 50, an upper part 51c having an exhaust aperture 51b protruded over the air separating chamber 50, an inner clean air exhaust duct 51, whole surface of the air exhaust duct 51 being provided with many small holes or mesh 51e, an outer clean air exhaust duct 52 disposed surrounding the inner air exhaust duct 51 with a predetermined distance, the lowest end of the inner air exhaust duct 51 being closed and whole surface of the same being provided with many small holes or mesh 52b, small balls or the like filled between the inner and outer air exhaust ducts 51 and 52, a cylindrical air dividing chamber 54 disposed surrounding the upper part 51c of said inner air exhaust duct 51 connecting to the aperture 50e disposed coaxially with the air separating chamber 50, a dust included raw air intake aperture 55 provided to intake the raw air to the cylindrical air dividing chamber 54 from tangential direction, and a spiral airflow adjustment and acceleration mechanism 56 having a plural number of spiral airflow adjustment and acceleration grooves 56c and disposed on the plate 56a provided surrounding the inner clean air exhaust duct 51 and located underneath the upper wall 50d of the air separating chamber 50 with a predetermined distance.

BRIEF DESCRIPTION OF THE DRAWINGS

FIGS. 5a and 5b show a first embodiment of cyclone type dust collector according to the present invention.

DETAILED DESCRIPTION OF THE PREFERRED EMBODIMENTS

Figure 1:
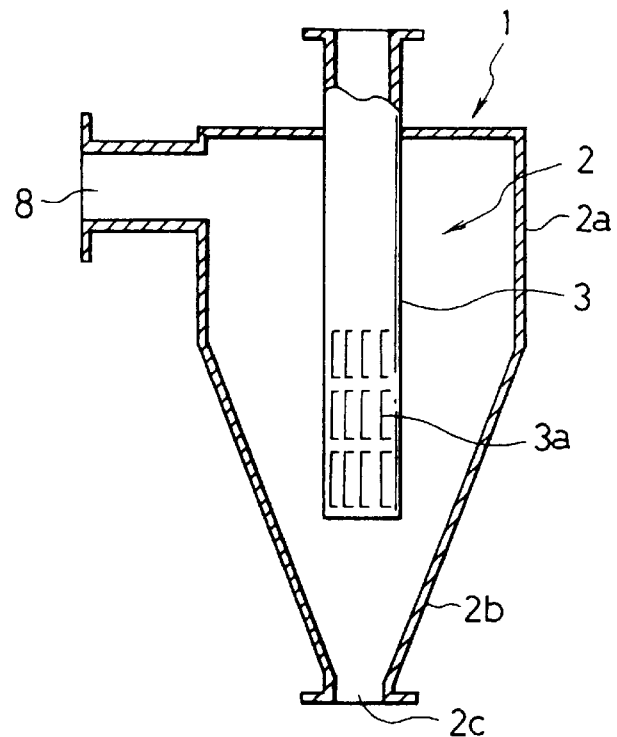
FIG. 1 is a vertical cross-section of a conventional cyclone type dust collector.
Figure 2:
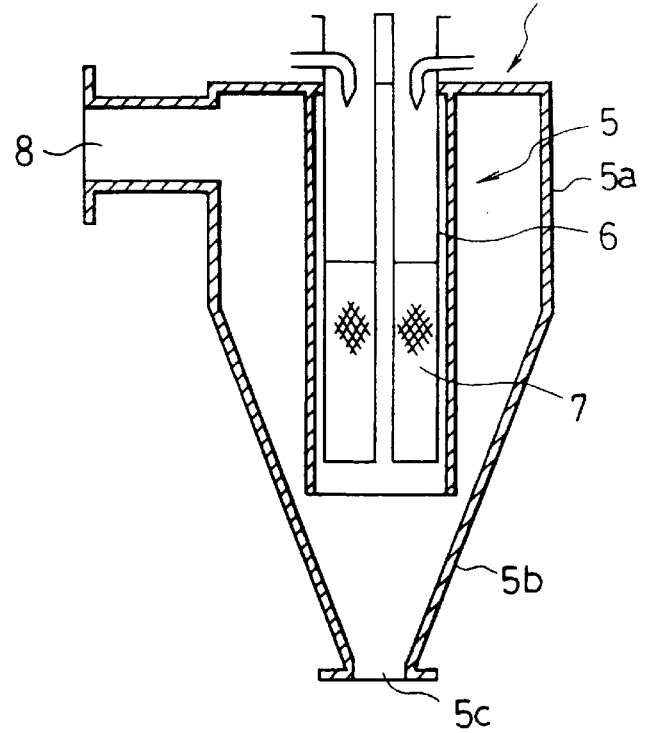
FIG. 2 is a vertical cross-section of other conventional cyclone type dust collector.
Figure 3:
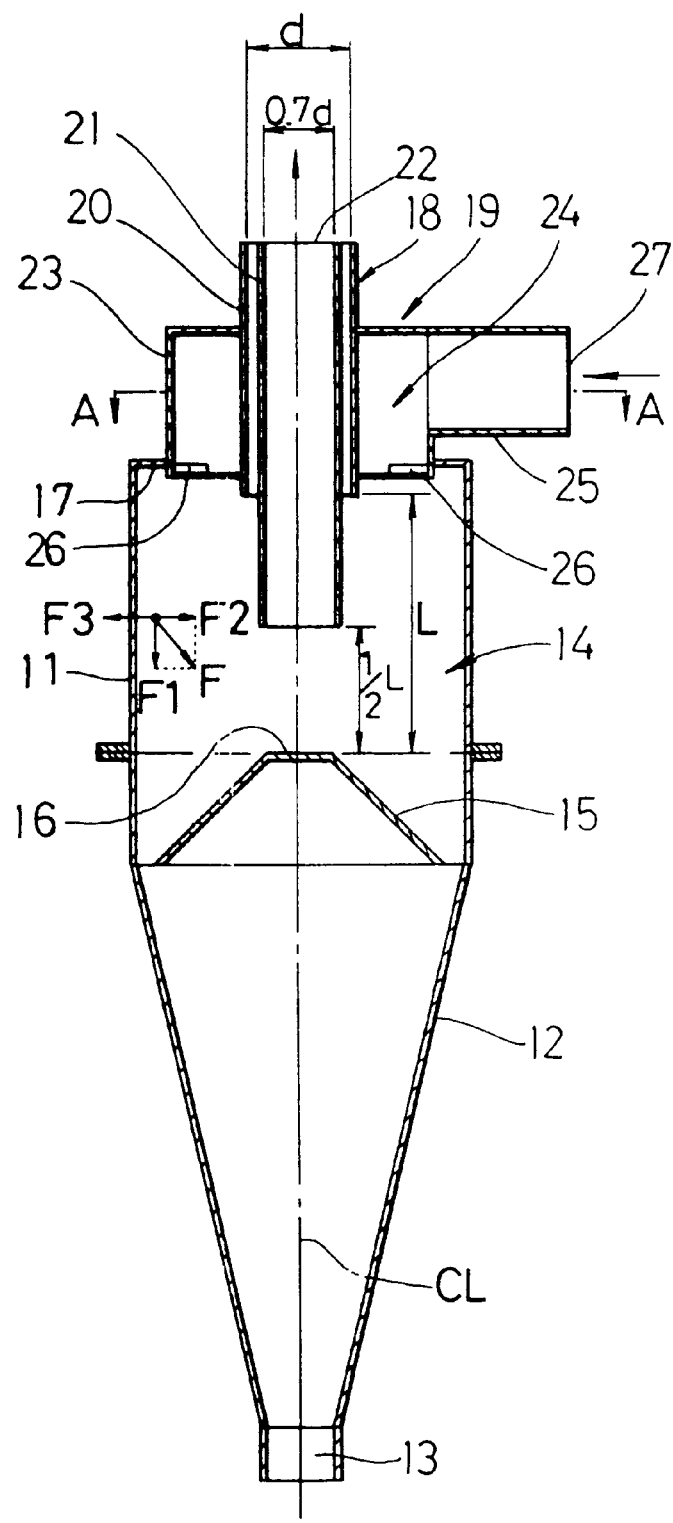
FIG. 3 is a vertical cross-section of another conventional cyclone type dust collector.
Figure 4:
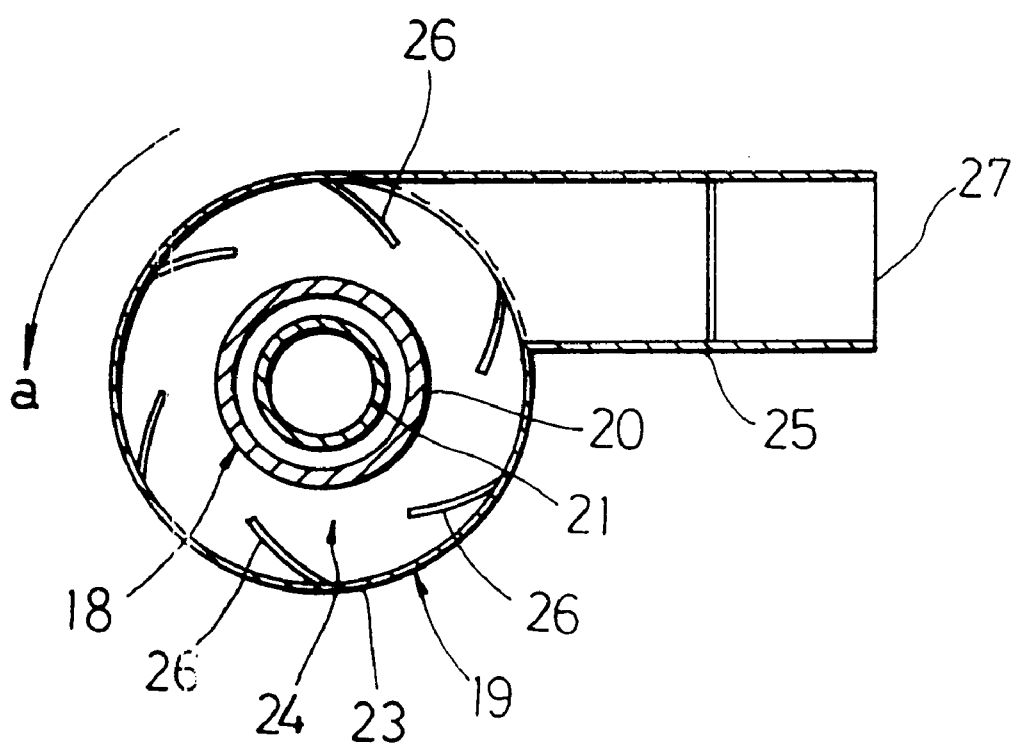
FIG. 4 ia a horizontal cross-section taken along A—A line in FIG. 3.

Now the present invention is explained with reference to the accompanying drawings.

In FIG. 5(a) is a cross-section showing the first embodiment of the cyclone type dust collector according to the present invention and FIG. 5(b) is an enlarged view of a part of FIG. 5(a) indicated with reference letter X. Reference numeral 30 indicates an air separating chamber. The air separating chamber has a dust included raw air intake aperture 30a in tangential direction to a cylinder. The upper part is a cylinder 30b and the lower part is a reversed circular cone 30c and a dust exhaust aperture 30d is disposed at the lowest end of the reversed circular cone 30c.

Figure 6:
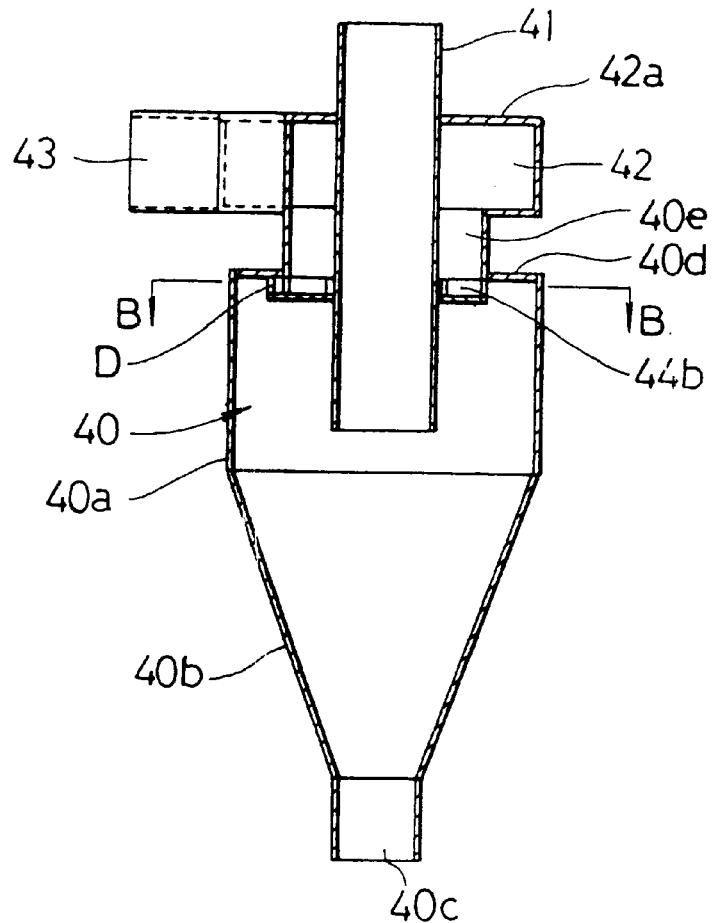
FIG. 6 is second embodiment of cyclone type dust collector according to the present invention.
Figure 7:
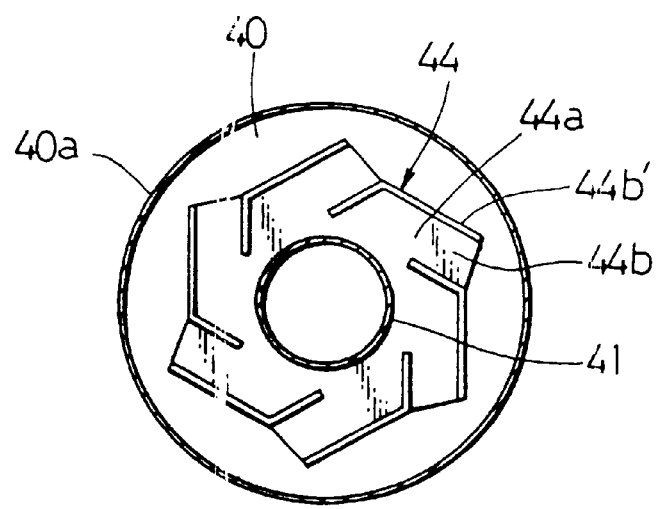
FIG. 7 is a horizontal cross-section taken along B—B line in FIG. 6.
Figure 8:
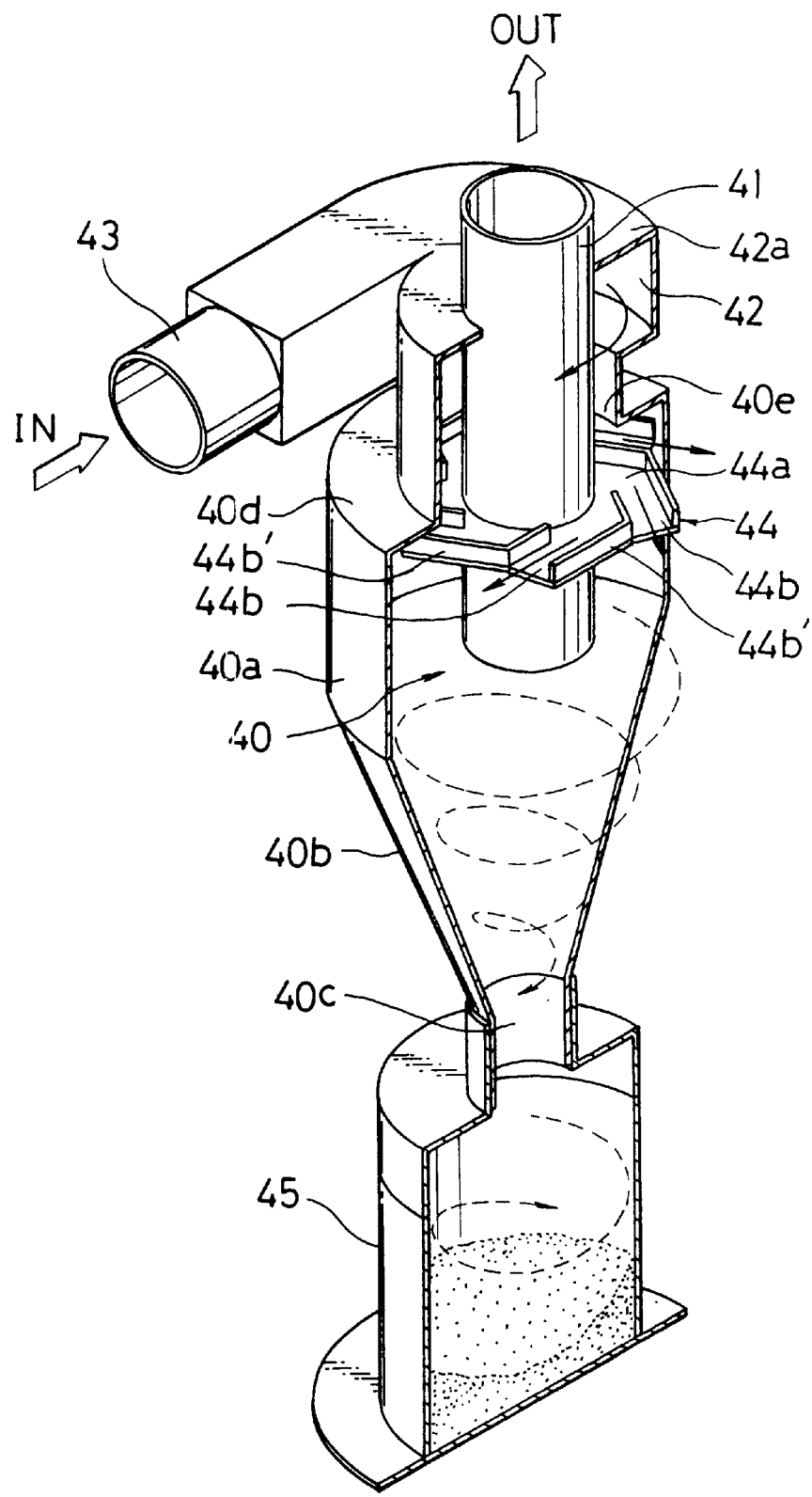
FIG. 8 is an enlarged perspective view of FIG. 6.
Figure 9:
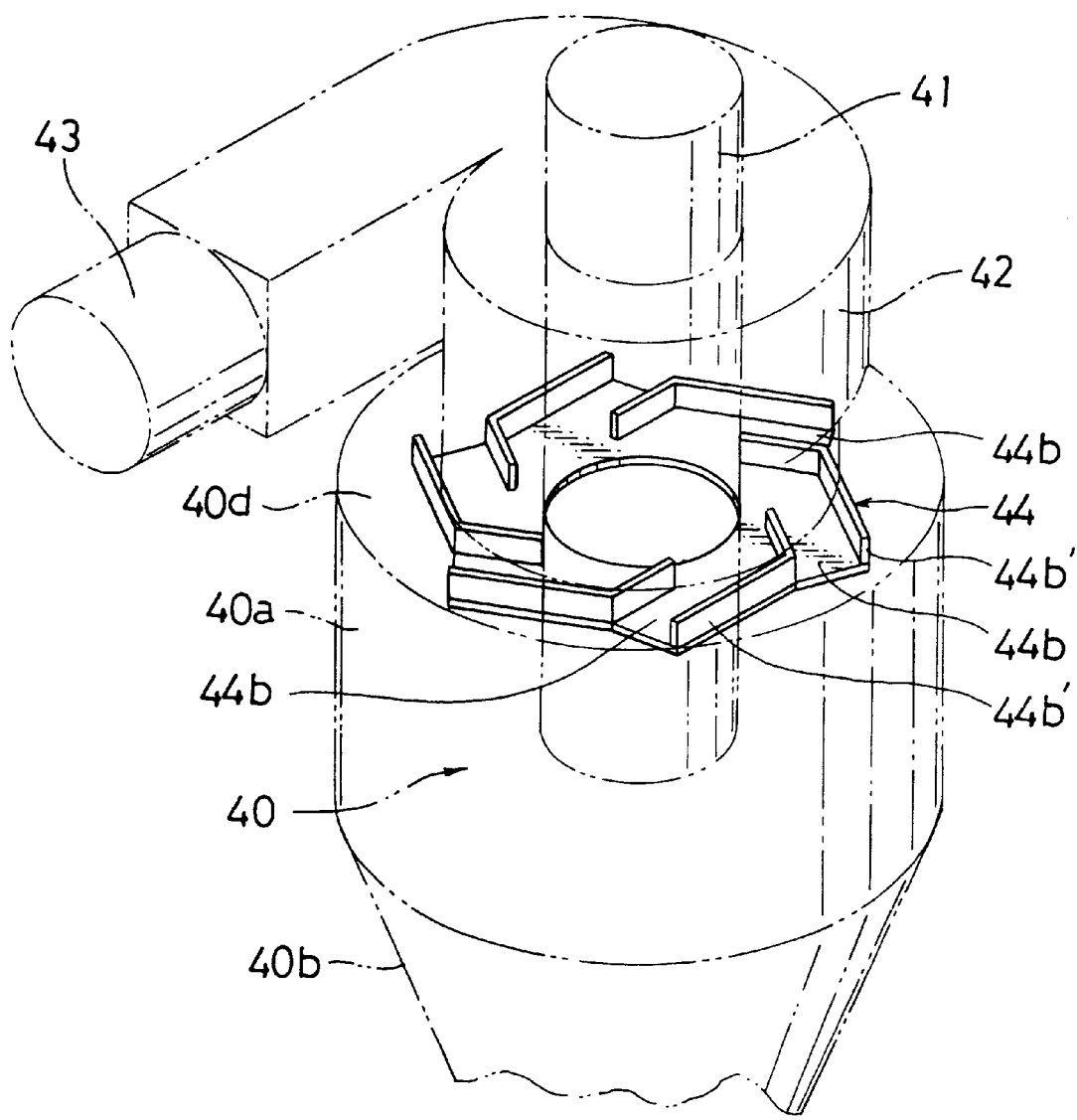
FIG. 9 is an enlarged perspective view of spiral airflow adjustment and acceleration mechanism of FIG. 8.

Reference numeral 31 indicates an inner clean air exhaust duct. The inner clean air exhaust duct 31 is disposed coaxially passing through the air separating chamber 30. The clean air exhaust aperture 31a is provided at upper end of the air exhaust duct 31 and said exhaust aperture 31a is connected to an air suction apparatus (not shown in the figure). The lowest end of said inner clean air exhaust duct 31 is closed. There are provided many small holes or mesh 31 on the whole surface 31b of the air exhaust duct 31. Reference numeral 33 indicates small balls or the like of e.g. 3 mm in diameter filled between said inner exhaust duct 31 and said outer exhaust duct 32. These small balls or the like are made of glass, plastics, ceramics, electric stone, zeolite, active aluminum, silica gel, metals (light metals), etc. The second embodiment of the present invention will now be explained. FIG. 6 indicates a vertical cross-section of cyclone type dust collector according to the present invention. FIG. 7 indicates a horizontal cross-section taken along B—B line in FIG. 6. FIG. 8 is a vertical perspective cross-sectional view. FIG. 9 is a perspective view of the spiral airflow adjustment and acceleration mechanism. In these figures, reference numeral 40 indicates an air separating chamber. The air separating chamber comprises a cylinder 40a of upper part and a reversed circular cone 40b of lower part. A dust exhaust aperture 40c is disposed at the lowest end of the reversed circular cone 40b.

The second embodiment is explained with reference to FIG. 8 and FIG. 9. Reference numeral 41 indicates a clean air exhaust duct which communicates with to a suction apparatus (not shown in the figure). Reference numeral 42 indicates a cylindrical air dividing chamber having an upper wall 42a connected to an aperture 40e disposed concentrically at the upper wall 42a of the air separating chamber 40. Reference numeral 43 indicates dust included raw air intake duct supplying dust included raw air to the cylindrical air dividing chamber 42 in tangential direction. Reference numeral 44 indicates a spiral airflow adjustment and acceleration mechanism which is the main subject of the present invention. The spiral airflow adjustment and acceleration mechanism 44 comprises six airflow adjustment plates 44b' which accelerate the airflow disposed on the plate 44b provided surrounding the clean air exhaust duct 41. Reference numeral 45 indicates a detachably attached dust accumulation vessel.

When total area of cross-section of six spiral airflow adjustment and acceleration grooves 44b crossing to airflow direction at right angles is set at ½ of total area of cross section of said dust included raw air intake duct 43 crossing to airflow direction at right angles, a velocity of airflow passing through the spiral airflow adjustment and acceleration grooves 44b grows twice as fast as the velocity of the airflow passing through the raw air intake duct 43. The centrifugal force to accelerate the flow of dust in airflow is strengthened and the dust is gathered to the inner surface of the air separating chamber 40 and clean air remaining near the center of the air separating chamber 40 is exhausted through the clean air exhaust duct 41.

If total area of the cross-section of the six spiral airflow adjustment and acceleration grooves 44b crossing the airflow direction at right angles is set at ¼ of total area of cross section of said dust included raw air intake duct 43 crossing the airflow direction at right angles, a velocity of airflow passing through the spiral airflow adjustment and acceleration grooves 44b grows four times as fast as the velocity of the airflow passing through the raw air intake duct 43.

When cyclone type dust collector is a large one, two dust included raw air intake ducts 43 can be connected to said cylindrical air dividing chamber 42 in tangential direction at two apertures. Dust included raw air introduced from the two intake apertures is treated by one cyclon type dust collector. A plural number of raw air intake ducts more than two are of course available.

Next, the third embodiment conmbined aforementioned first and second cyclone type dust collectors is expalined with reference to the follwoing figures.

Figures 10A, 10B:
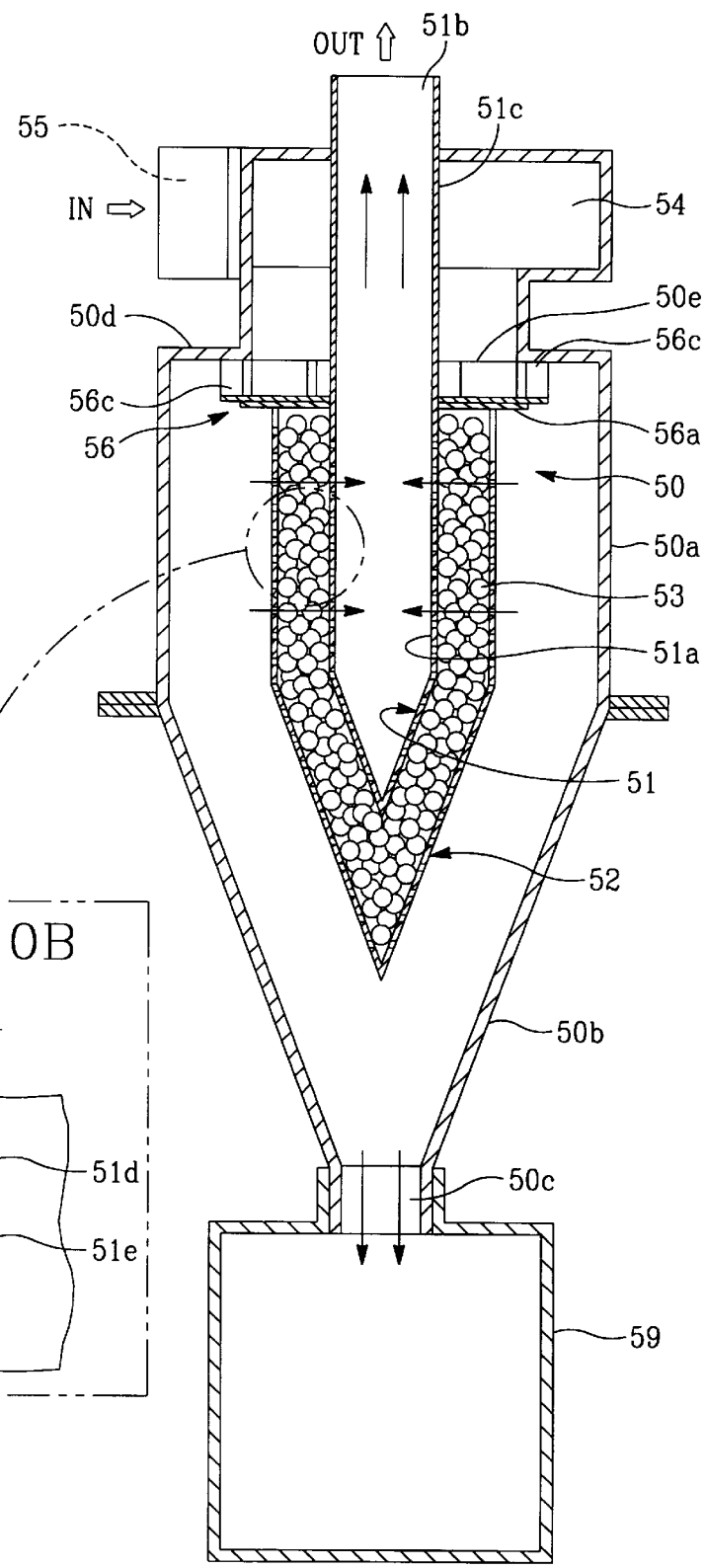
FIGS. 10a and 10b show third embodiment of cyclone type dust collector according to the present invention.

In FIG. 10, (a) is a vertical cross-section of the cyclone type dust collector which shows the third embodiment of the present invention. FIG. 10(b) is an enlarged drawing of the part indicated in FIG. 10 (a) with reference letter Y. FIG. 7 indicates a spiral airflow adjustment acceleration mechanism taken along the B—B line in FIG. 6(a). (This mechanism is quite the same as the mechanism appeared in the second embodiment. FIG. 7 shows the cross section taken along the B—B line of FIG. 6 and councurrently the cross section taken along the A—A line of FIG. 10.) FIG. 9 is a perspective view of said spiral airflow adjustment and acceleration mechanism. Said mechanism was detailedly explained in the foregoing paragraphs, the repeated explanation is omitted.

Now FIG. 10 is explained hereinafter. Reference numeral 50 indicates an air separating chamber. The air separating chamber comprises a cylinder 50a of upper part and a reversed circular cone 50b of lower part. A dust exhaust aperture 50c is disposed at the bottom of the reversed circular cone 50b. Reference numeral 51 indicates an inner clean air exhaust duct. A lower part of the inner clean air exhaust duct 51a is closed. Reference numeral 51c indicates an upper part of the inner clean air exhaust duct 51. The upper part 51c having a clean air exhaust aperture 51b is protruded over the apparatus and connected to a suction apparatus (vacuum system but not shown in the figure). There are provided many small holes or mesh 51e over the whole surface 51d located in the air separating chamber 50.

Reference numeral 52 indicates an outer clean air exhaust duct which is disposed surrounding the inner clean air exhaust duct 51 in the air separating chamber 50 with a predetermined distance. The lowest end of the outer clean air exhaust duct 51 is closed. There are provided many small holes or mesh 52b on the whole surface 52a of the air exhaust duct 51. Reference numeral 53 indicates small balls of diameter 3 mm or the like filled between said outer clean air exhaust duct 51 and said inner clean air exhaust duct 52. These small balls or the like are made of glass, plastics, ceramics, electric stone, zeolite, active aluminum, silica gel, metals (light metals), etc.

Reference numeral 54 indicates a cylindrical air dividing chamber disposed surrounding the upper part 51c of said inner clean air exhaust duct 51. A dust included raw air intake aperture 55 is disposed to intake raw air at the cylindrical air dividing chamber 54 in tangential direction.

Reference numeral 56 indicates a spiral airflow adjustment and acceleration mechanism. As detailedly shown in FIG. 6 and FIG. 9, the spiral airflow adjustment and acceleration mechanism 56 comprises six airflow adjustment and acceleration grooves 56c (indicated by reference numeral 44b in FIG. 9 and hereinafter reference numeral in parenthesis indicates the same part in FIG. 6 or FIG. 9) formed on the plate 56a (44a). The plate 56a is disposed surrounding the inner clean air exhaust duct 51 (41) and underneath the upper wall 50d (40d) and the aperture 50e (40e) with a predetermined distance (the distance is shown with reference letter D in FIG. 6). Reference numeral 59 indicates a dust accumulation vessel detachably connected to a dust discharge outlet 50c of the air separating chamber 50.

The third embodiment is composed as aforementioned. If raw air is introduced in the cylindrical air dividing chamber 54 in the velocity of 12–20 m/s from the air intake duct 55, the raw air is adjusted to spiral airflow and concurrently accelerated by means of six spiral airflow adjustment and acceleration grooves 56c.

If total area of cross section of the six spiral airflow adjustment and acceleration grooves crossing the airflow coming through the spiral air adjustment and acceleration mechanism at right angles is composed of ½ of the cross sectional area of said dust included raw air intake aperture 55, the airflow velocity flowing through said spiral airflow adjustment and acceleration grooves 56c is raised up twice as faster as the velocity of the airflow passing through said raw air intake aperture 55. Thus efficiency of dust exhausting function is raised up. Further, the clean air remained in the central part of the air separating chamber 50 passes through the small holes or mesh 52b disposed on the whole surface 52a of the outer clean air exhaust duct 52 and further passes through the small balls or the like 53 filled between the inner and outer exhaust ducts. Fine dust remains between the outer clean air exhaust duct 52 and the inner clean air exhaust duct 51. Clean air passes through the small holes or mesh 51c provided on the the whole surface 51d of the inner clean air exhaust duct 51. Clean air is exhausted outward from an upper clean air exhaust aperture 51b.

Figure 11:
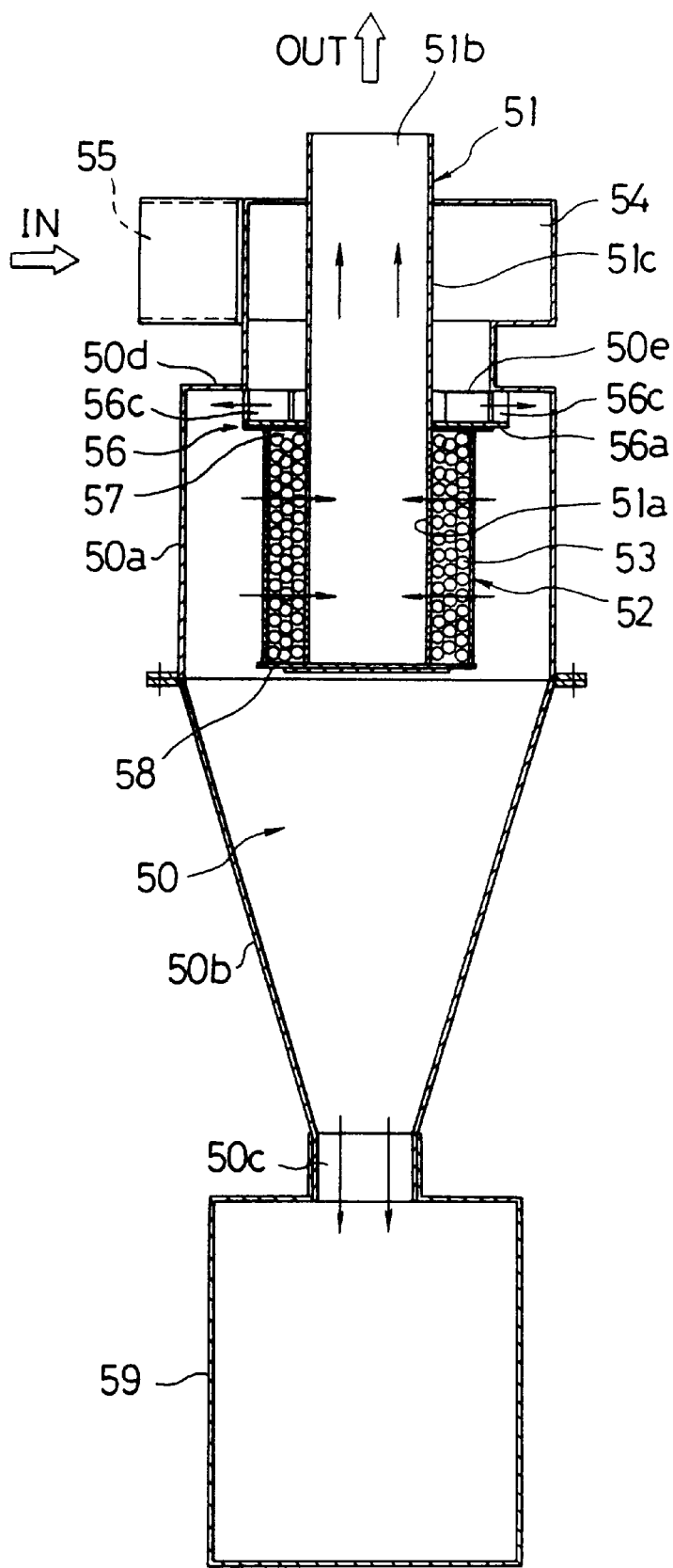
FIG. 11 is fourth embodiment of cyclone type dust collector according to the present invention.

FIG. 11 is a vertical cross-section of the fourth embodiment of the cyclone type dust collector according to the present invention. The fourth embodiment differs from the third embodiment in the follwoing points.

The upper part 51c of the inner clean air exhaust aperture 51b disposed coaxially with the air separating chamber 50 is protruded over the air separating chamber 50. Many small holes or mesh are disposed on the whole surface of the lower part 51a of the air separating chamber 50. (Refer to (b) of FIG. 10.)

The outer clean air exhaust duct 51 disposed surrounding the inner clean air exhaust duct 51 in the air separating chamber 50 with a predetermined distance is provided with many small holes or mesh on the whole surface (refer to (b) of FIG. 10). Small balls or the like 53 are filled orderly or inorderly between the inner clean air exhaust duct 51 and the outer clean air exhaust duct 52 through a filling aperture 57 disposed on the upper part of said inner and outer exhaust ducts. The lower end of the inner and the outer exhaust ducts are closed with a lid plate 58. When small balls or the like are replaced with new ones the lid plate 58 is removed so that the small balls or the like 53 are easily expelled.

Figure 12:
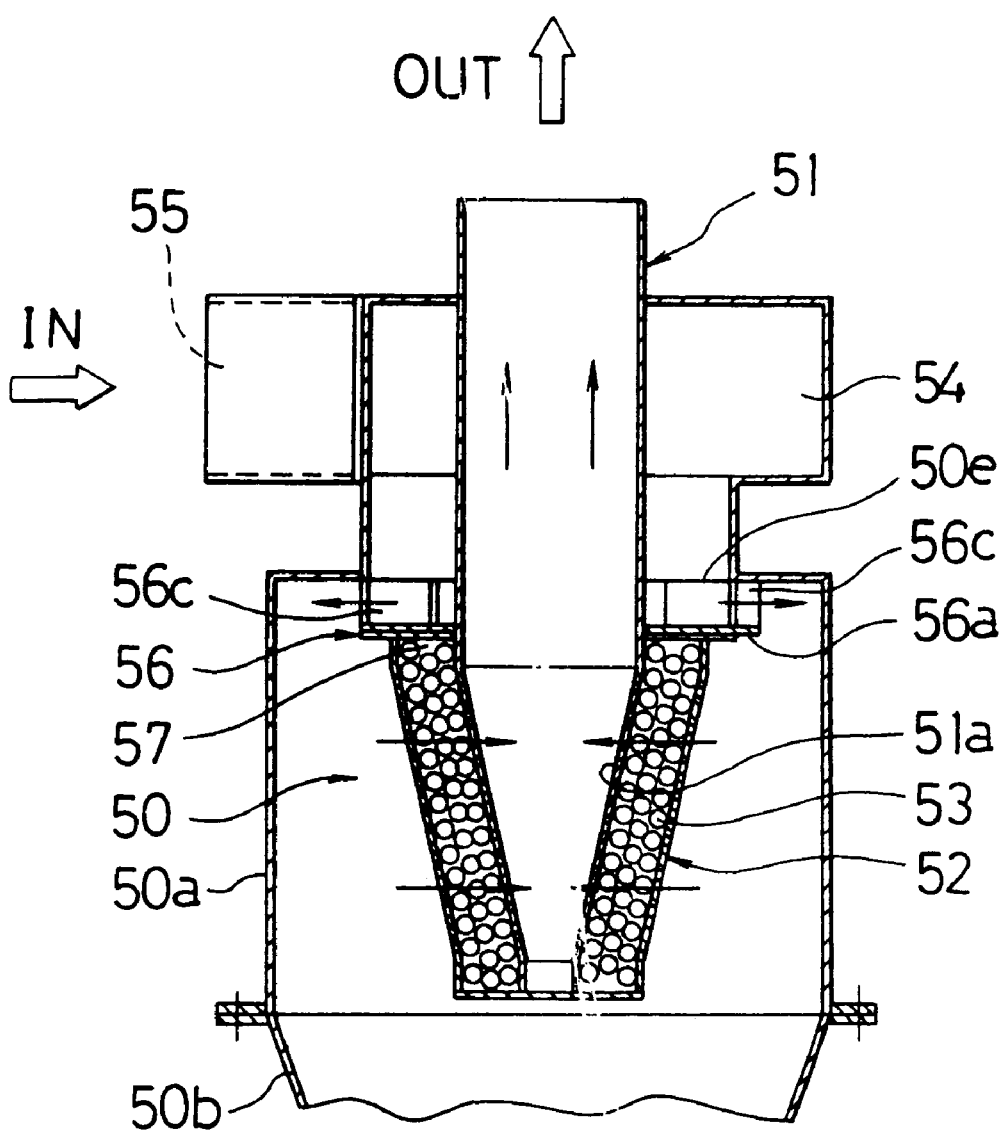
FIG. 12 is fifth embodiment of cyclone type dust collector according to the present invention.

FIG. 12 is a vertical cross-section of the fifth embodiment of the cyclone type dust collector according to the present invention. The fifth embodiment differs from the fourth embodiment. Both the inner clean air exhaust duct 51 and the outer clean air exhaust duct 52 gradually decrease their diameters toward the lowest ends.

Figure 13:
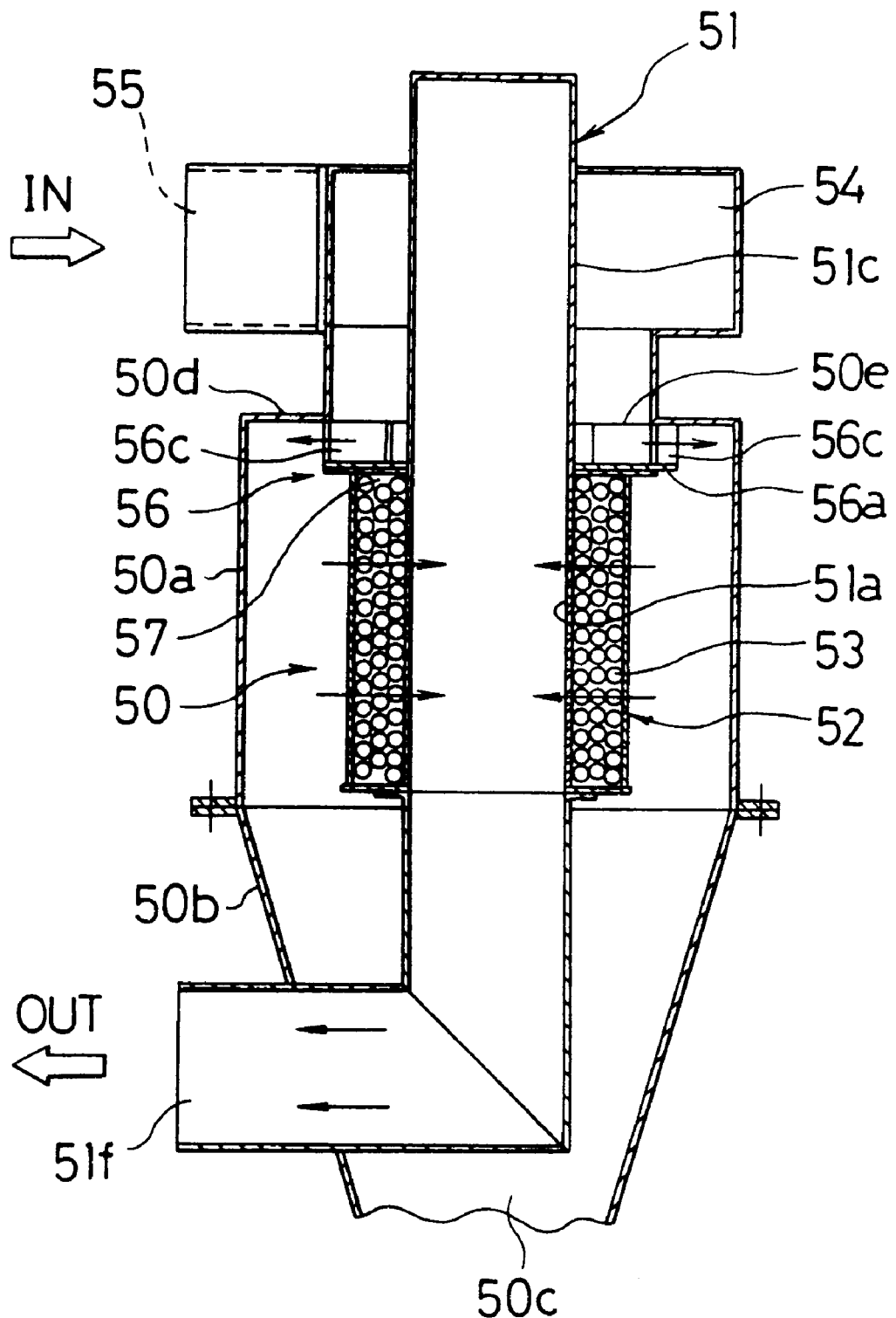
FIG. 13 is sixth embodiment of cyclone type dust collector according to the present invention.

FIG. 13 is a vertical cross-section of the sixth embodiment of the cyclone type dust collector according to the present invention. The sixth embodiment differs from the fourth embodiment. The sixth embodiment has a clean air exhaust aperture 51f connecting to a suction (vacuum) apparatus (not shown in the figure) through the lowest end. The clean air exhaust duct is disposed coaxially with the air separating chamber 50. The closed upper part 51c protrudes outward over the air separating chamber 50. The outer clean air exhaust pipe 52 (refer to (b) of FIG. 10) provided with many small holes or mesh on the whole surface thereof is disposed surrounding the inner clean air exhaust duct 51 provided with many small holes or mesh on the whole surface thereof with a predetermined distance. There are many small balls or the like 53 between the inner clean air exhaust duct 51 and the outer clean air exhaust duct 52.

Figure 14:
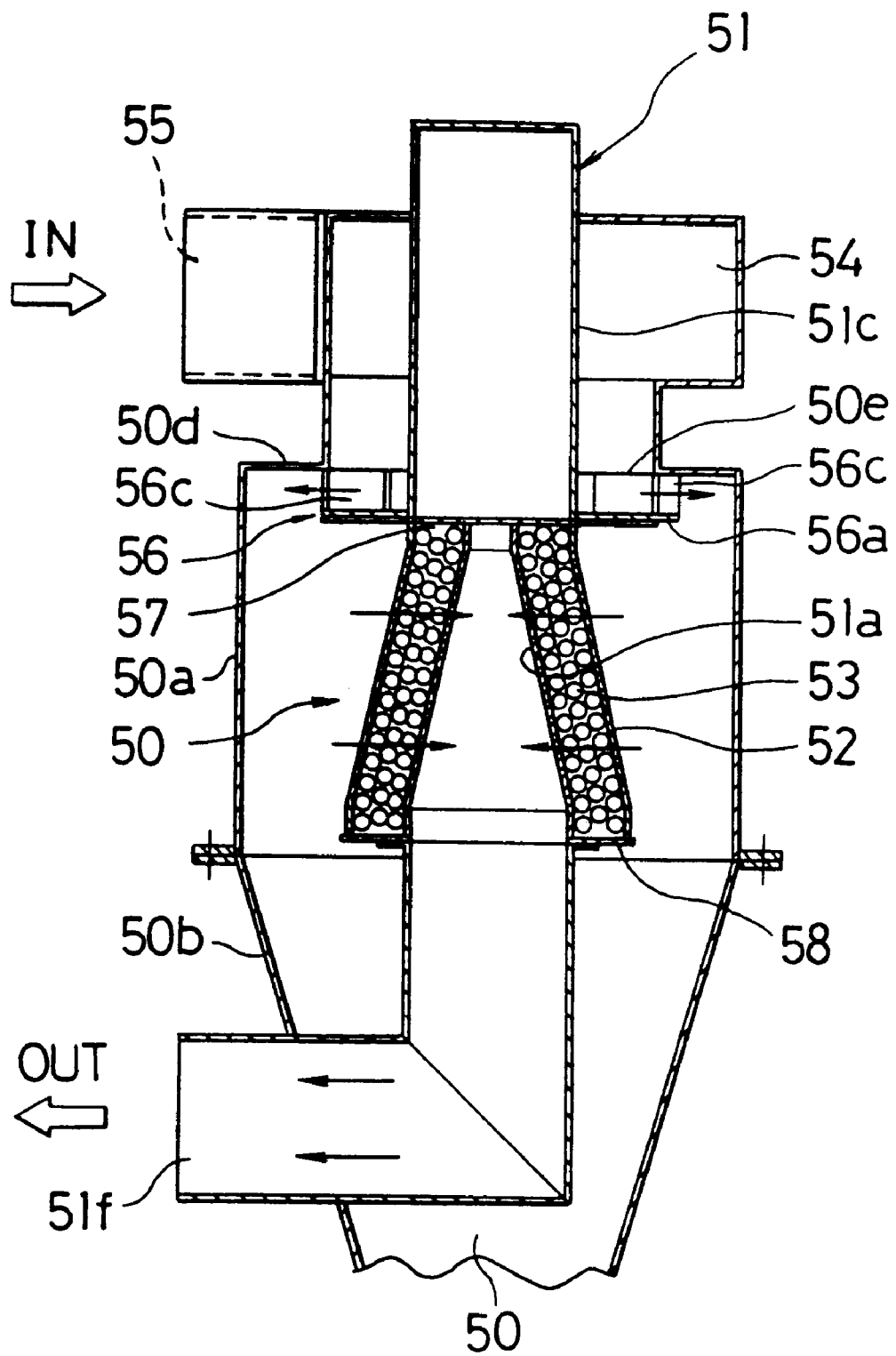
FIG. 14 is seventh embodiment of cyclone type dust collector according to the present invention.

FIG. 14 is a vertical cross-section of the seventh embodiment of the cyclone type dust collector according to the present invention. The seventh embodiment differs from the sixth embodiment. Diameters of the inner clean air exhaust duct 51 and the outer clean air exhaust duct 52 become smaller toward the upper parts.

EFFECTS OF THE INVENTION

The present invention comprises the inner and outer clean air exhaust ducts provided with small holes or mesh on the whole surfaces thereof, respectively. Small balls or the like are filled between the inner and outer ducts. The dust included raw air passes through between the small balls or the like. The dust included in the raw air is caught by said small balls or the like. The dust accumulates between the outer and the inner air exhaust ducts. The accumulated dust naturally grows larger and said dust falls down with its weight or through vibration of the ducts. Clean air flows into the inner clean air exhaust duct through the small holes or mesh and the dust is exhausted through the clean air exhaust aperture of the inner clean air exhaust duct.

Small holes provided over the whole surfaces of the inner and outer clean air exhaust ducts assist the air in passing through the ducts smoothly. Unlike the prior art there is no problem of clogging the filter.

As aforementioned, the dust collector of the present invention is provided with the spiral airflow adjustment and acceleration mechanism. The air introduced into the air dividing chamber from the air intake aperture further goes to the air separating chamber through the spiral airflow adjustment and acceleration mechanism. The centrifugal force generated by means of the spiral airflow adjustment and acceleration mechanism assists the air in gathering on the inner surface of the air separating chamber. While, clean air remained in the central part of the air separating chamber is exhausted.

Further, air passes through the small holes or mesh over the whole surfaces of the inner and outer clean air exhaust ducts. Air is exhausted by combination of spiral airflow adjustment and acceleration mechanism and small balls or the like filled between the inner and outer clean air exhaust ducts. Efficiency of dust exhaustion is greatly improved. Dust of Micron size or submicron size is exhausted.

What is claimed is:

1. A cyclone type dust collector comprising:
    an air separating chamber having a cylinder at an upper part and a reversed circular cone at a lower part, a dust exhaust aperture disposed at a bottom of the reversed circular cone of the air separating chamber, a clean air exhaust duct disposed concentrically with an axial center of the air separating chamber, a cylindrical air dividing chamber connected to an aperture disposed on an upper wall of the air separating chamber, a dust laden raw air intake duct connected to the cylindrical air dividing chamber along a tangential direction;

a plate disposed in parallel to said upper wall and circumscribing said clean air exhaust duct and located at an inner position from an aperture disposed on the upper wall of the air separating chamber with a predetermined distance to thereby provide a clearance between the plate and the upper wall;

a plurality of vertical walls disposed on said plate, each of said vertical walls defining a first leg radially extending from said axial center and a second leg radially extending from said axial center, wherein said second leg extends in a direction that is angled with respect to said first leg; and a spiral airflow adjustment and acceleration mechanism having a plurality of spiral airflow adjustment and acceleration grooves to adjust and accelerate the spiral airflow entering the air separating chamber, each of said grooves being defined by two adjacent walls of said plurality of vertical walls, wherein dust laden raw air passes through said plurality of spiral airflow adjustment and acceleration grooves extending toward an outer circumference of said air separating chamber so as to generate spiral airflow toward an inner wall of the outer circumference of said air separating chamber after flowing around the circumference of said clean air exhaust duct.

2. A cyclone type dust collector as defined in claim 1 wherein a plurality of raw air intake ducts are connected to the cylindrical air dividing chamber and disposed in said tangential direction.

3. A cyclone type dust collector comprising:

an air separating chamber including a cylinder at an upper part, a reversed circular cone at a lower part, and a dust exhaust aperture at the lower part of the reversed circular cone, an inner clean air exhaust duct disposed coaxially with the air separating chamber, a bottom of the inner clean air exhaust duct being closed, a clean air exhaust aperture of said inner clean air exhaust duct being protruded over the air separating chamber and a whole surface of said inner clean air exhaust duct being provided with a plurality of small holes in the air separating chamber, an outer clean air exhaust duct disposed surrounding the inner clean air exhaust duct with a predetermined distance in the air separating chamber, a bottom of the outer clean air exhaust duct being closed and a whole surface of said outer clean air exhaust duct being provided with a plurality of small holes, small balls provided between said inner and outer clean air exhaust ducts, a cylindrical air dividing chamber disposed surrounding the upper part of said inner clean air exhaust duct connecting to the aperture disposed on an upper wall of the air separating chamber coaxially with the air separating chamber, a dust laden raw air intake aperture to introduce raw air into the cylindrical air dividing chamber in a tangential direction;

a plate disposed surrounding said clean air exhaust duct and offset from an aperture disposed on the upper wall of the air separating chamber to thereby a provide a predetermined clearance between the plate and the upper wall, said plate and said upper wall being disposed in parallel relation to one another;

a plurality of vertical walls disposed on said plate, each of said vertical walls defining a first leg radially extending in a radial direction and a second leg radially extending in said radial direction, wherein said second leg extends in a direction that is angled with respect to said first leg; and a spiral airflow adjustment and acceleration mechanism having a plurality of spiral airflow adjustment and acceleration grooves extending toward the outer circumference of said air separating chamber to adjust and accelerate a spiral airflow entering the air separating chamber, each of said grooves being defined by two adjacent walls of said plurality of vertical walls, the dust laden raw air passing through said plurality of spiral airflow adjustment and acceleration grooves so as to generate said spiral airflow toward an inner wall of the outer circumference of said air separating chamber after flowing around the circumference of said clean air exhaust duct.

4. A cyclone type dust collector comprising:

an air separating chamber including a cylinder defining an upper part, a reversed circular cone defining a lower part, and a dust exhaust aperture at the lower part of the reversed circular cone, an inner clean air exhaust duct disposed coaxially with the air separating chamber, a clean air exhaust aperture of said inner clean air exhaust duct projecting over the upper part of the air separating chamber and a whole surface of said inner clean air exhaust duct being provided with many small holes within the air separating chamber, an outer clean air exhaust duct circumscribing the inner clean air exhaust duct with a predetermined separation in the air separating chamber, the bottom of the outer clean air exhaust duct being closed and a whole surface of said outer clean air exhaust duct being provided with many small holes, small balls disposed between said inner and outer clean air exhaust ducts, a filling aperture to insert the small balls between the inner clean air exhaust duct and the outer clean air exhaust duct and a lid plate to close the aperture between said inner clean air exhaust duct and said outer clean air exhaust duct to prevent the small balls from being discharged, a cylindrical air dividing chamber disposed surrounding the upper part of said inner clean air exhaust duct connected to the aperture disposed on an upper wall of the air separating chamber coaxially with the air separating chamber, a dust laden raw air intake aperture to introduce the raw air into the cylindrical air dividing chamber in a tangential direction;

a plate circumscribing said clean air exhaust duct and located at inner position from the aperture disposed on the upper wall of the air separating chamber with a predetermined distance, said plate and said upper wall being disposed in parallel relation to one another;

a plurality of vertical walls disposed on said plate, each of said vertical walls defining a first leg radially extending in a radially direction and a second leg radial extending in said radial direction, wherein said second leg extends in a direction that is angled with respect to said first leg; and a spiral airflow adjustment and acceleration mechanism having a plurality of spiral airflow adjustment and acceleration grooves extending toward the outer circumference of said air separating chamber to adjust and accelerate a spiral airflow entering the air separating chamber, the dust laden raw air passing through said plurality of spiral airflow adjustment and acceleration grooves so as to generate said spiral airflow toward an inner wall of the outer circumference of said air separating chamber after flowing around the circumference of said clean air exhaust duct.

5. A cyclone type dust collector comprising:

an air separating chamber consisting of a cylinder at an upper part, a reversed circular cone at a lower part, and a dust exhaust aperture at the lower part of the reversed circular cone, an inner clean air exhaust duct disposed coaxially with the air separating chamber, a bottom of the inner clean air exhaust duct being disposed with a clean air exhaust aperture, an upper end of said inner clean air exhaust duct being closed, and an upper part of said duct being protruded over the air separating chamber and a whole surface of said inner clean air exhaust duct being provided with a plurality of small holes in the air separating chamber, an outer clean air exhaust duct circumscribing the inner clean air exhaust duct with a predetermined distance therebetween in the air separating chamber, said outer clean air exhaust duct being provided with a plurality of small holes on the whole surface, small balls disposed between said inner and outer clean air exhaust ducts, a filling aperture to insert the small balls between the inner clean air exhaust duct and the outer clean air exhaust duct and a lid plate to close the filling aperture between said inner clean air exhaust duct and said outer clean air exhaust duct to prevent the small balls from being discharged, a cylindrical air dividing chamber circumscribing the upper part of said inner clean air exhaust duct connected to the aperture disposed on the upper wall of the air separating chamber coaxially with the air separating chamber, a dust laden raw air intake aperture to introduce raw air into the cylindrical air dividing chamber in a tangential direction;

a plate disposed surrounding said clean air exhaust duct and located at an inner position from an aperture disposed on the upper wall of the air separating chamber with a predetermined gap therebetween, said plate and said upper wall being disposed in parallel relation to one another;

a plurality of vertical walls disposed on said plate, each of said vertical walls defining a first leg radially extending in a radial direction and a second leg radially extending in said radial direction, wherein said second leg extends in a direction that is angled with respect to said first leg; and a spiral airflow adjustment and acceleration mechanism having a plurality of spiral airflow adjustment and acceleration grooves extending toward the outer circumference of said air separating chamber to adjust and accelerate the spiral airflow coming into the air separating chamber, the dust laden raw air passing through said plurality of spiral airflow adjustment and acceleration grooves so as to generate said spiral airflow toward an inner wall of the outer circumference of said air separating chamber after flowing around the circumference of said clean air exhaust duct.

6. A cyclone type dust collector as defined in claim 5 wherein a plurality of dust included raw air intake apertures are disposed in said tangential direction to the cylindrical air dividing chamber.

* * * * *